United States Patent
Pannell et al.

(10) Patent No.: US 9,229,518 B1
(45) Date of Patent: Jan. 5, 2016

(54) WAKE-ON-FRAME FOR FRAME PROCESSING DEVICES

(75) Inventors: Donald Pannell, Cupertino, CA (US); Hong Yu Chou, Saratoga, CA (US)

(73) Assignee: Marvell International Ltd. (BM)

(*) Notice: Subject to any disclaimer, the term of this patent is extended or adjusted under 35 U.S.C. 154(b) by 715 days.

(21) Appl. No.: 12/916,968

(22) Filed: Nov. 1, 2010

Related U.S. Application Data

(60) Provisional application No. 61/257,581, filed on Nov. 3, 2009.

(51) Int. Cl.
*G06F 1/32* (2006.01)

(52) U.S. Cl.
CPC ............ *G06F 1/3203* (2013.01); *G06F 1/3287* (2013.01)

(58) Field of Classification Search
CPC ....................................................... H04L 12/66
See application file for complete search history.

(56) References Cited

U.S. PATENT DOCUMENTS

| | | | |
|---|---|---|---|
| 5,848,281 A * | 12/1998 | Smalley et al. | 713/322 |
| 5,938,771 A * | 8/1999 | Williams et al. | 713/310 |
| 6,360,327 B1 * | 3/2002 | Hobson | 713/300 |
| 6,529,530 B1 * | 3/2003 | Ichii et al. | 370/537 |
| 6,535,982 B1 * | 3/2003 | Kawabe et al. | 713/300 |
| 6,665,802 B1 * | 12/2003 | Ober | 713/320 |
| 6,795,450 B1 * | 9/2004 | Mills et al. | 370/463 |
| 2002/0006139 A1 * | 1/2002 | Kikkawa et al. | 370/502 |
| 2002/0009081 A1 * | 1/2002 | Sampath et al. | 370/389 |
| 2002/0061012 A1 * | 5/2002 | Thi et al. | 370/352 |
| 2004/0067782 A1 * | 4/2004 | Kagan et al. | 455/575.1 |
| 2004/0071250 A1 * | 4/2004 | Bunton et al. | 375/372 |
| 2006/0067357 A1 * | 3/2006 | Rader | 370/463 |
| 2006/0080563 A1 * | 4/2006 | Perozo et al. | 713/322 |
| 2007/0150766 A1 * | 6/2007 | Kuwahara | 713/300 |
| 2008/0148083 A1 * | 6/2008 | Pesavento et al. | 713/322 |
| 2009/0282277 A1 * | 11/2009 | Sedarat et al. | 713/320 |
| 2009/0310607 A1 * | 12/2009 | Evans | 370/389 |
| 2009/0328152 A1 * | 12/2009 | Thomas et al. | 726/4 |
| 2010/0208724 A1 * | 8/2010 | Booth et al. | 370/352 |
| 2012/0105637 A1 * | 5/2012 | Yousefi et al. | 348/148 |

* cited by examiner

*Primary Examiner* — Alpus H Hsu
*Assistant Examiner* — Hooman Houshmand

(57) ABSTRACT

Systems, methods, and other embodiments associated with wake-on-frame mechanisms are described. According to one embodiment, an apparatus includes a packet source configured to send packets to a frame processing device and a wake-on-frame mechanism that is selectable by the frame processing device between an enabled state and a disabled state. If the wake-on-frame mechanism is in the enabled state, a packet source that has a frame to send to the frame processing device sends a wake signal to the frame processing device prior to sending the packet. The packet source sends the packet to the frame processing device after receiving a ready signal from the frame processing device.

10 Claims, 5 Drawing Sheets

WAKE-ON-FRAME FOR FRAME PROCESSING DEVICES

CROSS REFERENCE TO RELATED APPLICATIONS

This application claims the benefit of U.S. provisional application Ser. No. 61/257,581 filed on Nov. 3, 2009, which is hereby wholly incorporated by reference.

BACKGROUND

Minimizing power usage is an important focus for networking products. For example, recently Energy Star prompted the IEEE 802.3 group to work according to a standard called Energy Efficient. Ethernet (EEE). As part of the effort to meet this standard, physical layer networking devices (PHYs) are now typically designed to power down as much as possible when there is no network traffic. However, devices associated with media access control (MAC), such as processors, field programmable gate arrays, and so on, that receive packets from PHYs and process packets for transfer outside of a local network are typically maintained in a powered state so that they can be ready to receive packets for processing at any time.

SUMMARY

In one embodiment, an apparatus includes a packet source configured to send packets to a frame processing device and a wake-on-frame mechanism that is selectable by the frame processing device between an enabled state and a disabled state. The packet source is configured to determine a current state of the wake-on-frame mechanism when a packet is present for transmission to the frame processing device. If the wake-on-frame mechanism is in the enabled state, the packet source sends a wake signal to the frame processing device prior to sending the packet. The packet source sends the packet to the frame processing device after receiving a ready signal from the frame processing device. The ready signal indicates that the frame processing device is ready to receive packets.

In another embodiment, a method includes receiving a packet and checking a status of a wake-on-frame mechanism associated with a media access control (MAC) device. The wake-on-frame mechanism indicates whether the MAC device is in an active state or an inactive state. If the wake-on-frame mechanism indicates that the MAC device is in the inactive state, prior to sending the packet, a wake signal is sent to the media access control (MAC) device. In response to receiving, from the MAC device, a ready signal that indicates that the MAC device is ready to receive packets, the method includes sending the packet to the MAC device.

In one embodiment, a device includes a media access control (MAC) device configured to process packets for routing external to an Ethernet network and a wake-on-frame mechanism that is set by the MAC device between an enabled state and a disabled state. The MAC device is configured to enable the wake-on-frame mechanism prior to entering a low power consumption state and to disable the wake-on-frame mechanism in response to receiving a wake-on-frame interrupt signal and entering a normal operating state. The device also includes an Ethernet switch configured to send selected packets to the MAC device. The Ethernet switch is configured to determine a current state of the wake-on-frame mechanism when a packet is present for sending to the MAC device, and if the wake-on-frame mechanism is in the enabled state, to send the wake-on-frame interrupt signal to the MAC device prior to sending the packet. The Ethernet switch is further configured to send the packet to the MAC device after the wake-on-frame mechanism is disabled by the MAC device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example systems, methods, and other embodiments associated with saving energy in communication devices. In one embodiment, a wake-on-frame mechanism is provided that allows a device that receives packets for routing related processing (frame processing device) to power down (e.g., power down completely or enter a low power consumption state) when not processing packets and to be woken up by a packet source. With wake-on-frame, the packet source confirms that the frame processing device has been powered up and is ready to receive a packet before sending the packet to the frame processing device. This ensures that packets will not be dropped due to the frame processing device being powered down or inactive.

Figure 1:
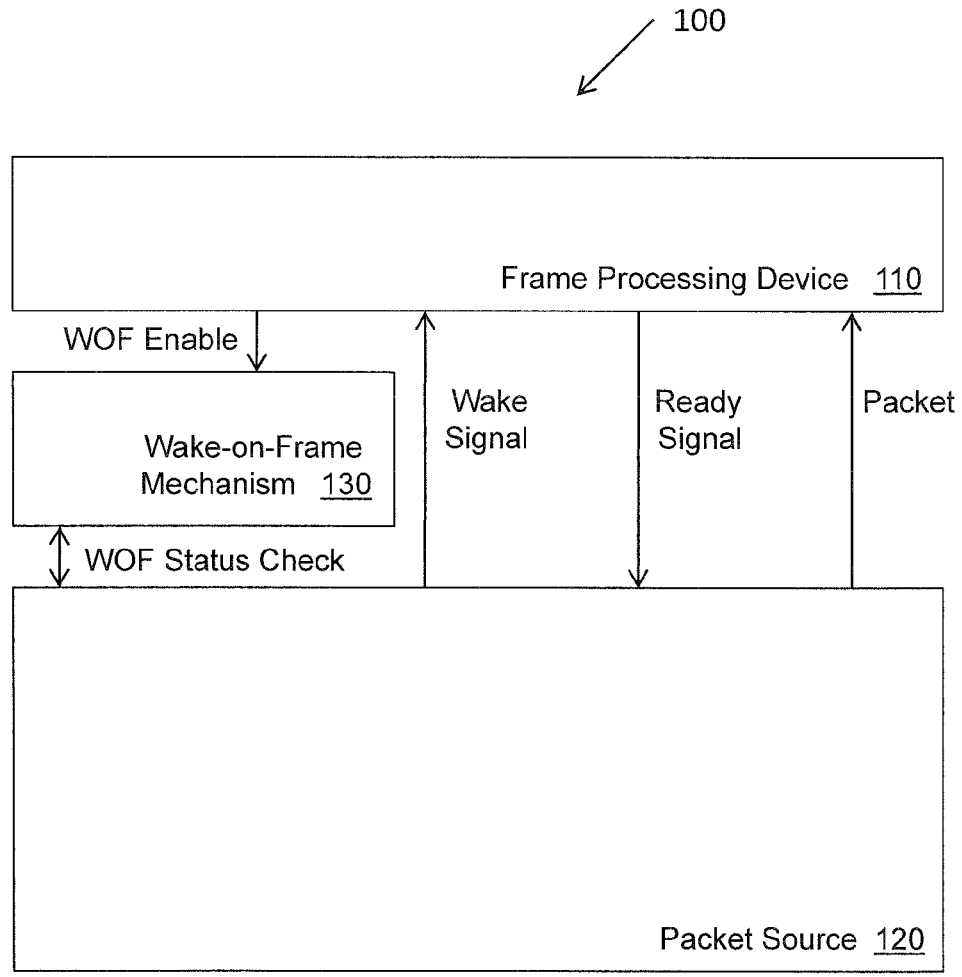
FIG. 1 illustrates one embodiment of an apparatus associated with wake-on-frame for frame processing devices.

With reference to FIG. 1, one embodiment of a packet-processing system 100 is shown that is configured with a wake-on-frame mechanism. The system 100 may be implemented in a router or managed or unmanaged switch that routes data packets between devices within a local Ethernet network and in some instances to external networks (e.g., via the Internet). The system 100 includes a frame processing device 110, a packet source 120, and a wake-on-frame mechanism 130 connected therebetween. The term "packet source" is used herein to denote the component that is sending a packet/frame to the frame processing device 110. The packet source 120 is not necessarily the originating device of the packet but more likely receives the packet from another remote device.

In one embodiment, the frame processing device 110 and the packet source 120 are part of the same network device. For example, the frame processing device 110 is implemented as a media access control (MAC) device that is part of a media access control (MAC) layer. For example, the MAC device may be a CPU or Field Programmable Gate Array (FPGA). The packet source 120 may be implemented as a switch that is in turn connected to the physical (PHY) layer of the network device. The MAC and PHY layers of network routing devices are defined by the OSI model of computer networking. Two or more MACs can be interconnected as a switch (e.g., an Ethernet switch). The MAC is a sub-layer of the Data Link Layer of the OSI model that provides addressing and channel access control mechanisms that make it possible for multiple nodes in a multi-point network to communicate (e.g., local area network, metropolitan area network, etc.).

In one embodiment, the packet source 120 (e.g., Ethernet switch) and frame processing device 110 (e.g., CPU or FPGA) are part of the same routing device and can be implemented as part of the same integrated circuit (IC) chip or different chips. Packets that are transmitted between nodes within the local network can typically be processed by the switch without intervention by the frame processing MAC device (110). Packets that are to be transmitted outside the local network (e.g., to the Internet or other external network) are typically processed by the frame processing MAC device (110) prior to being sent out to the Internet.

For data packets that are to be transmitted to the Internet, the packet source 120 is configured to send the data packets first to the frame processing device 110 for processing related to routing. For example, a packet may be part of an email communication that was composed on a network node (e.g., an Ethernet network device, not shown). The packet is sent from the Ethernet network device to the routing device for routing to the Internet and arrives at the packet source 120. The packet is sent by the packet source 120 to the frame processing device 110 (the MAC layer). The frame processing device 110 processes the packet to enable the packet to be sent from the local network to the Internet.

Regarding the energy saving features, the frame processing device 110 can be powered down or put into a sleep mode (e.g., inactive state) when not processing packets. The inactive state can include being powered down completely or in a low power consumption state but not operating. Coordination of the state of the frame processing device 110 and communication with the packet source 120 is implemented with the wake-on-frame mechanism 130.

The wake-on-frame mechanism 130 is configured to be enabled or disabled by the frame processing device 110 (e.g., by setting a status bit) based on whether the frame processing device 110 is powered down or awake and ready to receive packets (e.g., a normal operating mode). Prior to powering down, the frame processing device 110 sets the status bit to indicate that the frame processing device 110 is in an inactive state (e.g. the wake-on-frame mechanism is enabled). After the frame processing device 110 wakes up and is active, the frame processing device 110 clears the status bit so that the wake-on-frame mechanism is disabled.

A packet that is ready "in the queue" for transmission by the packet source 120 is sometimes called a "frame." Many frame formats are used, one typical frame format includes a preamble field and a data field. Before the packet source 120 sends frames to the frame processing device 110, the packet source 120 checks the status bit from the wake-on-frame mechanism 130. If the status bit is set, the packet source 120 knows that the frame processing device 110 is inactive. Since the frame processing device 110 is inactive, the packet source 110 sends a wake signal to wake up the frame processing device 110 and holds frames until receiving confirmation from the frame processing device 110 that the frame processing device 110 is ready to receive packets. The packet source 120 waits for confirmation that the frame processing device 110 is ready to receive frames because if frames are sent while the frame processing device 110 is inactive or powering-up but not yet ready to receive frames, the sent frames might be dropped. By waiting for the confirmation, the packet source 110 can send frames without the frames being dropped.

When the wake-on-frame mechanism is disabled, the packet source 120 knows that the frame processing device 110 is active and can send frames to the frame processing device 110 without waiting. Thus the wake-on-frame mechanism is used by the packet source 120 to determine if the frame processing device 110 is active or not. In one sense, the wake-on-frame mechanism 130 provides a hand-shaking mechanism between the physical (PHY) layer or a switch layer and the media access control (MAC) layer of a network device to coordinate proper communication between the components during power saving modes. The power savings is accomplished without the special protocols or "magic packets" that are used in other power-saving techniques.

Figure 2:
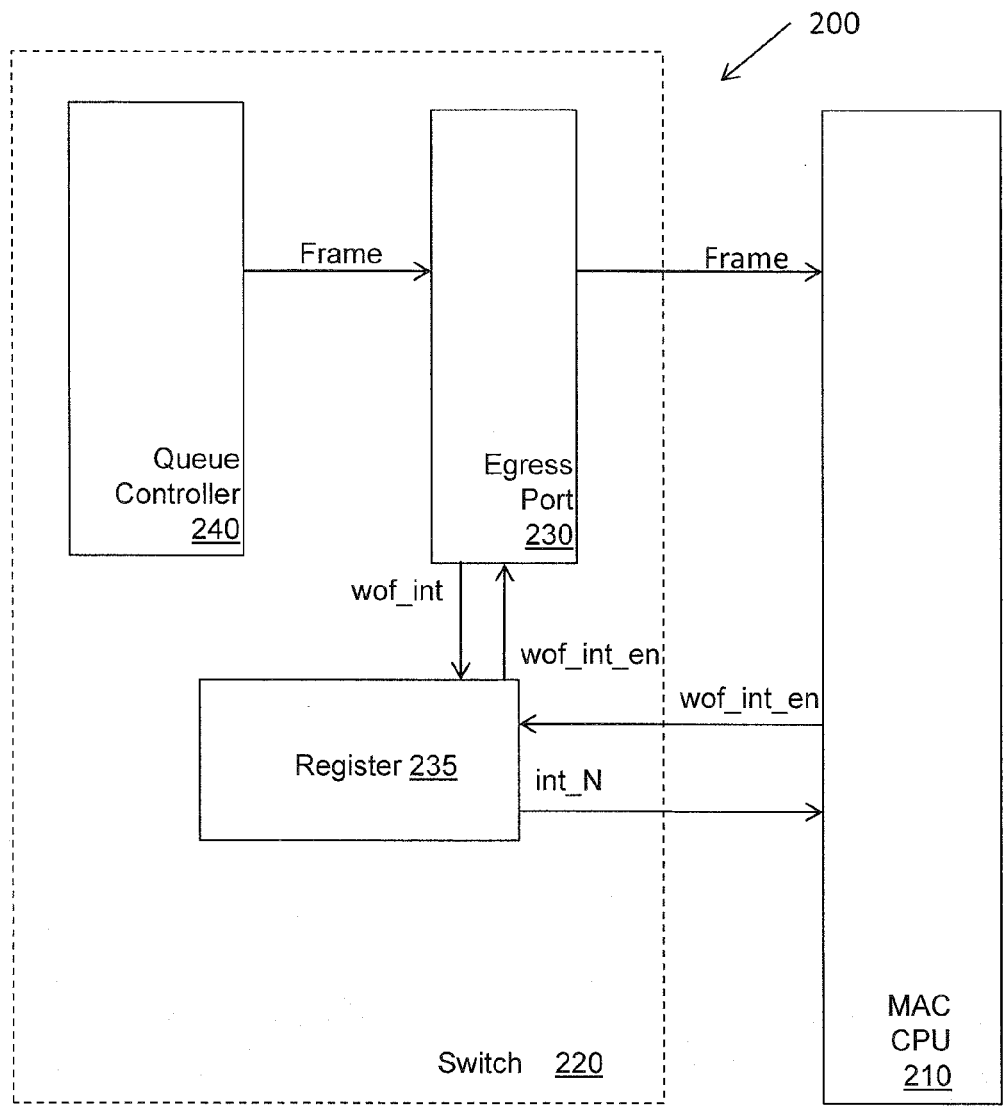
FIG. 2 illustrates one embodiment of an apparatus associated with wake-on-frame for frame processing devices.

With reference to FIG. 2, one embodiment of a packet processing system 200 that includes the wake-on-frame feature is shown. The system 200 includes a CPU 210 that performs MAC processing on data packets for routing purposes and a switch 220 that includes devices associated with the physical sending and receiving of data packets between devices in an Ethernet network. The CPU 210 and the switch 220 may be implemented on the same IC chip or on separate IC chips and are part of the same network router device. The devices associated with the switch 220 may include energy saving features such as Energy Efficient Ethernet.

In one embodiment, the switch 220 includes a queue controller (QC) 240 that orders packets according to prioritization rules and sends packets intended to be routed outside a local network as frames to an egress port 230, which in turn sends the frames to the CPU 210 for routing-related processing. The QC 240 is capable of holding and ordering several frames prior to sending the frames to the egress port 230. The egress port 230 has a register 235 that stores various bits used to communicate with the CPU 210. To enable the wake-on-frame feature, the CPU 210 sets a wake-on-frame enable bit (wof_int_en) in the register 235. Setting the enable bit indicates that the CPU 210 is, or is about to be, powered down and the CPU 210 can then power down.

When the egress port 230 receives a frame from the QC 240, the egress port 230 checks the wake-on-frame enable bit in the register 235. If the wake-on-frame enable bit is not set (meaning the CPU 210 is active), then the egress port 230 sends the frame to the CPU 210 without waiting. If the wake-on-frame enable bit is set (meaning the CPU 210 is inactive), the egress port 230 sets a wake-on-frame interrupt (wof_int) bit in the register 235. Setting of the wake-on-frame interrupt bit causes an interrupt (int_N) to be generated and sent to the CPU 210.

The CPU 210 includes wake-on-interrupt capability and will wake up in response to receiving the interrupt signal. The CPU 210 reads an interrupt source register (not shown) and determines that the interrupt signal was generated by the egress module 230 to indicate that a frame is waiting. When the CPU 210 is powered up and capable of receiving a frame the CPU clears the wake-on-frame enable bit. When the egress port 230 detects that the wake-on-frame enable bit is no longer set, the egress port 230 knows that the CPU 210 is now operating and sends the frame(s) to the CPU 210.

Figure 3:
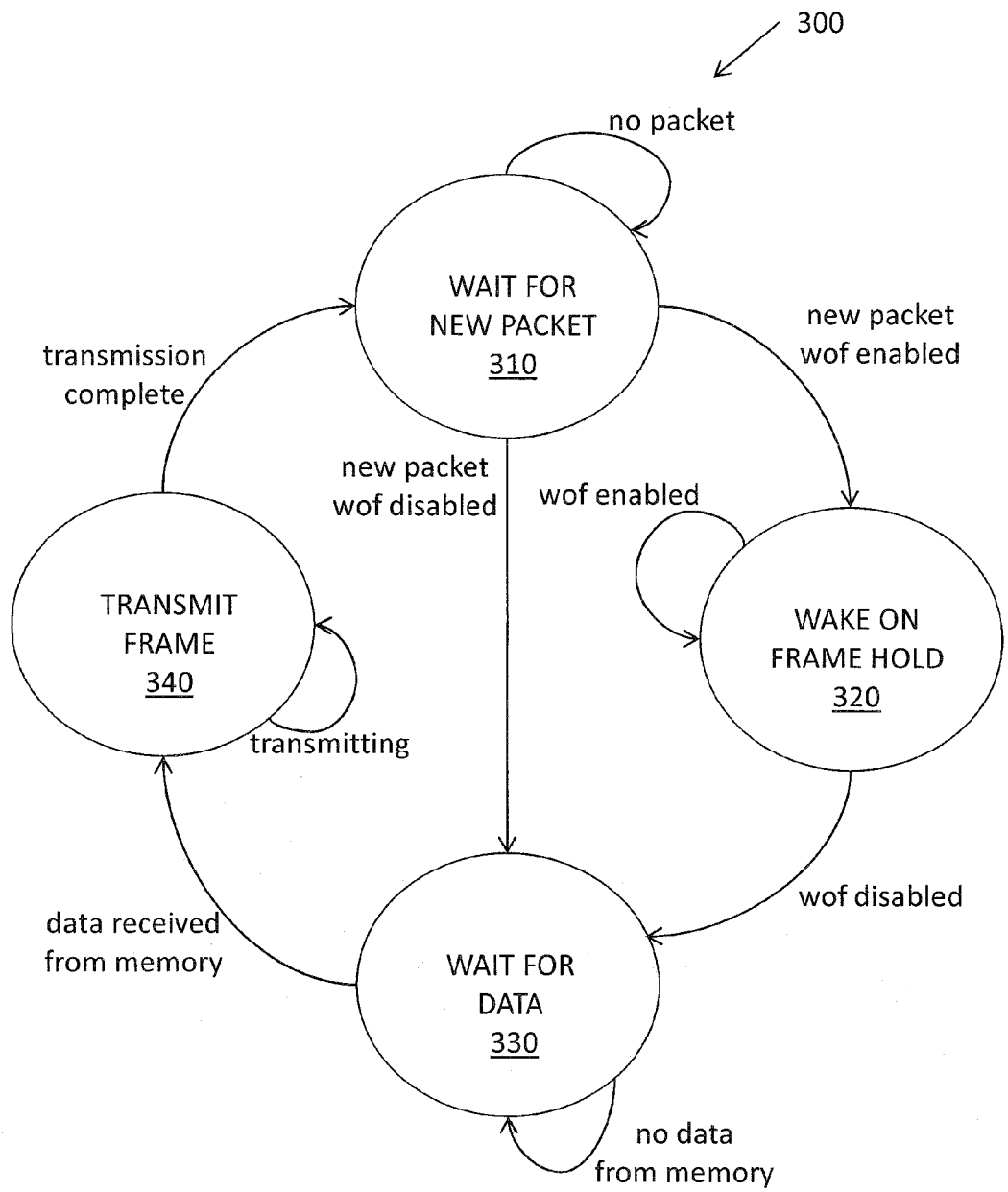
FIG. 3 illustrates one embodiment of a state diagram describing operation of one embodiment of an apparatus associated with wake-on-frame for frame processing devices.

FIG. 3 is a partial state diagram 300 that describes operation of an example embodiment of a packet source (e.g., egress port 230 from FIG. 2) with respect to wake-on-frame. In a first state 310, the packet source waits for a packet. The packet source transitions to state 320 if a new packet is received and the wake-on-frame mechanism is enabled (the frame processing device is inactive). In state 320, the frame is held as long as the wake-on-frame mechanism is enabled. The packet source also causes the wake signal to be sent to the frame processing device to initiate power-up. The packet source transitions to state 330 when the wake-on-frame mechanism is disabled by the frame processing device to indicate that frame processing device is powered-up and ready to receive packets.

In state 330, the packet source is waiting for the frame to be received from memory so that the frame can be sent to the frame processing device. When the frame is received from memory, the packet source transitions to state 340 and sends the frame to the frame processing device. After transmission of the frame is complete, the packet source enters state 310 and waits for a new packet. While the packet source is in state 310, if the wake-on-frame mechanism is not enabled, the packet source transitions to state 330 when a packet is received. In this case, transmission of the packet occurs without the packet source entering state 320.

Figure 4:
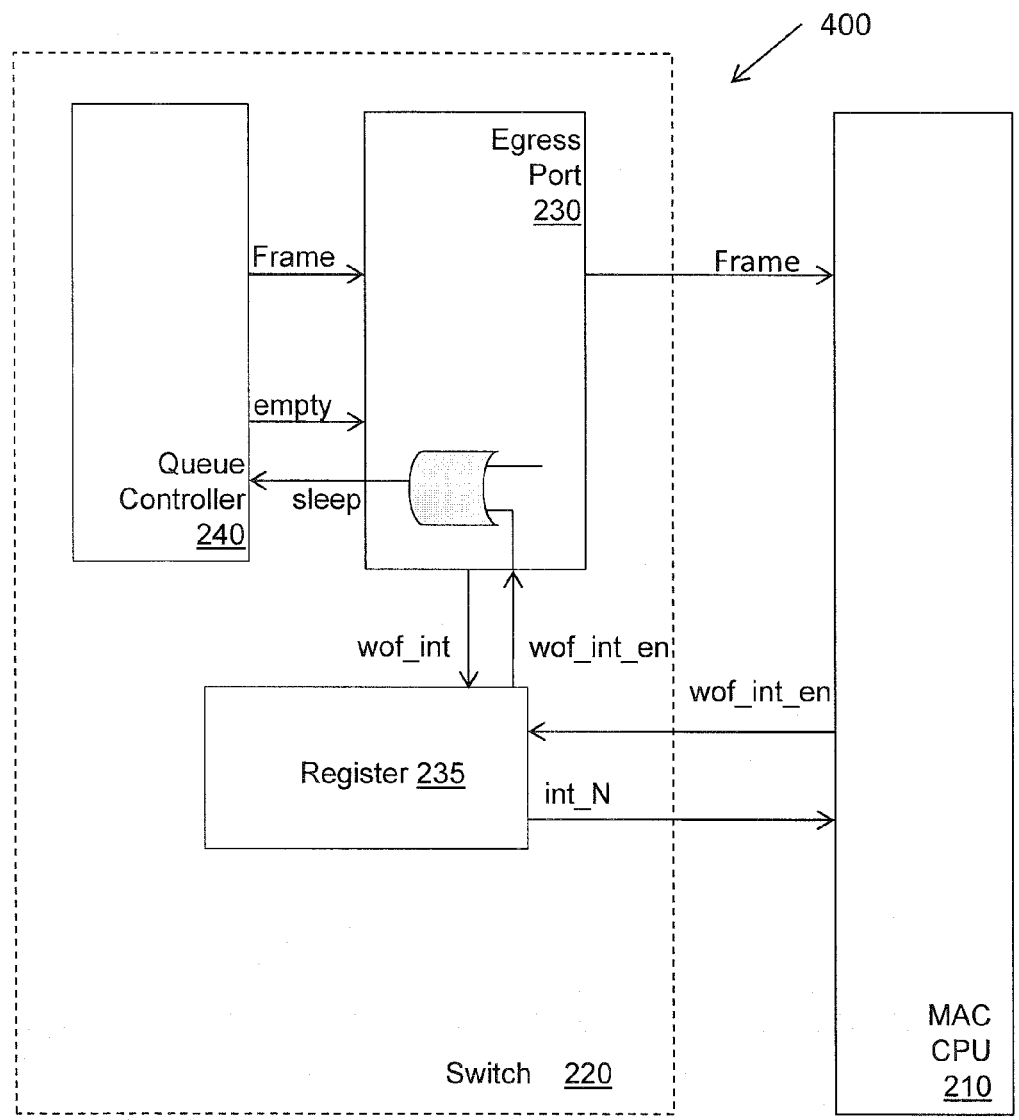
FIG. 4 illustrates one embodiment of an apparatus associated with wake-on-frame for frame processing devices.

FIG. 4 illustrates an example embodiment of a packet processing system 400 that includes an adaptation of wake-on-frame that provides packet prioritization. The system 400 includes similar components as the system 200 but includes a mechanism for prioritizing packets so that the packets are sent to the CPU 210 in order of priority rather than in order of receipt by the QC 240. Thus, if a higher priority packet is received by the QC 240 while the CPU 210 is in the process of waking up because of an initial packet received by the QC 240, the higher priority packet will be sent to the CPU 210 before the initial packet.

In this embodiment, the egress port 230 sends a sleep signal to the QC 240 when the wake-on-frame enable bit has been set by the CPU 210. The QC 240 is programmed to hold frames for transmission to the egress port 230 without ordering them for transmission by the egress port 230 while the sleep signal is present. The sleep signal may be the result of a logical OR operation on the wake-on-frame enable bit and other register bits associated with other energy saving features such as Energy Efficient Ethernet.

The QC 240 sends an empty signal to the egress port 230 when there are no frames to send. When the QC 240 has a frame ready for transmission, the QC de-asserts the empty signal. In response to the de-assertion of the empty signal, the egress port 230 checks the wake-on-frame enable bit (wof_int_en) and if the wake-on-frame enable bit is set, sends the interrupt signal (int_N) to the CPU 210 to wake up the CPU 210. Because the wake-on-frame enable bit is set, the sleep signal is still being asserted and the QC 240 will not schedule packets for transmission. Meanwhile, additional packets may be arriving at the QC 240 where the additional packets will accumulate until the sleep signal is de-asserted.

After the CPU 210 is powered up and ready to receive frames, the CPU 210 clears the wake-on-frame enable bit. Because the sleep signal is generated based on the wake-on-frame enable bit, clearing of the wake-on-frame enable bit will de-assert the sleep signal. At this time the QC 240, which has been accumulating packets while the CPU is powering up, will schedule the accumulated packets for transmission to the CPU 210 according to any prioritization rules that are in use for the network. Thus the highest priority frame (not necessarily the first received frame) is sent to the egress port 230 for transmission to the CPU 210.

Figure 5:
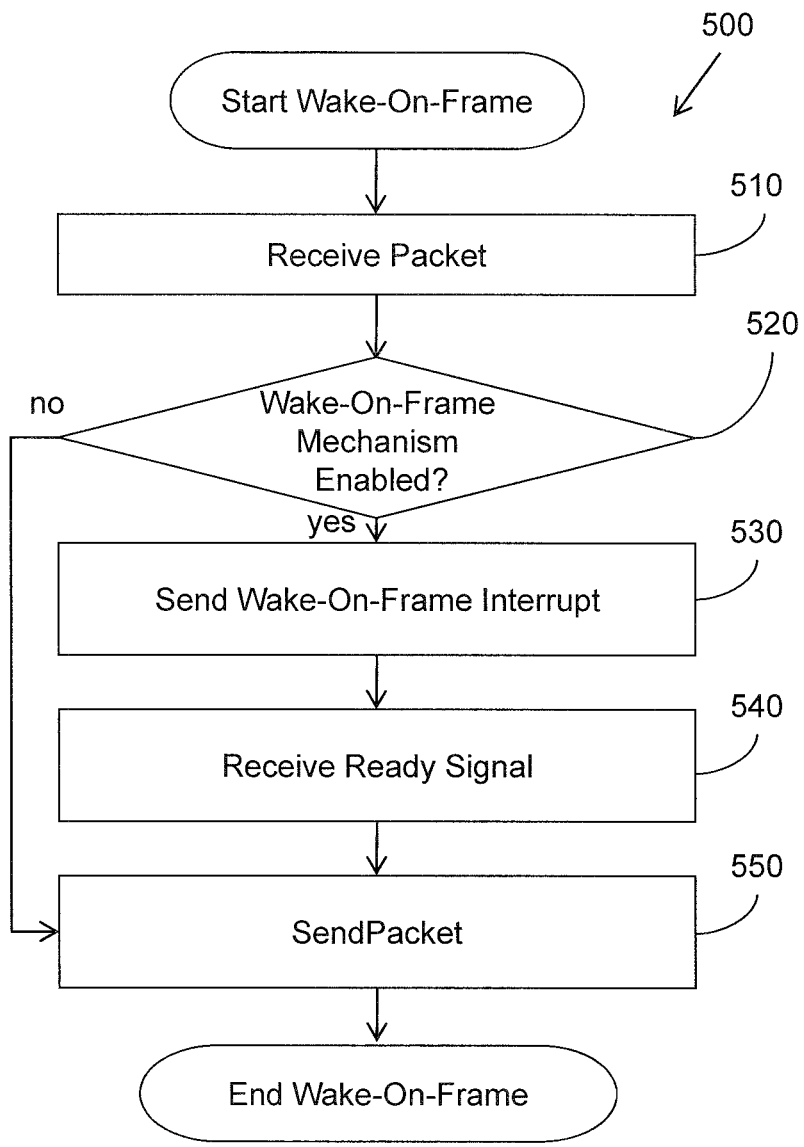
FIG. 5 illustrates one embodiment of a method associated with wake-on-frame for frame processing devices.

FIG. 5 illustrates one embodiment of a method 300 for performing wake-on-frame. At 510, a packet is received by a packet source. The packet is to be sent to a frame processing device for processing related to routing. At 520, a status of a wake-on-frame mechanism is checked by the packet source to determine if the frame processing device is active or not. The status may be determined by checking a wake-on-frame enable bit in an egress port register. If the wake-on-frame mechanism is not enabled (meaning the frame processing device is ready to receive packets), the packet is sent by the packet source to the frame processing device (block 550). At 530, if the wake-on-frame mechanism is enabled, prior to sending the packet, a wake signal is sent by the packet source to the frame processing device. In one embodiment, the wake signal is an interrupt signal that causes the frame processing device to power up. At 540, a ready signal is received by the packet source from the frame processing device that indicates that the frame processing device is ready to receive packets. The ready signal may be a clearing of the wake-on-frame enable bit by the frame processing device. At 550 the packet is sent to the frame processing device.

In one embodiment, the method may include accumulating packets for transmission after sending the wake signal to the frame processing device. Upon receiving the ready signal, highest priority packets are selected from the accumulated packets and the packets are sent to the frame processing device in an order based on their priority.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a media access control (MAC) layer comprising a central processing unit (CPU) that performs routing related processing on packets prior to sending the packets to one or more destination devices; and
   a physical (PHY) layer comprising a switch configured to send packets to the CPU;
   wherein the switch comprises an egress port register that includes a wake-on-frame enable bit that is capable of being set or cleared by the CPU; and
   wherein the switch is further configured to:
      wait for a new packet to be received for the CPU;
      when a new packet is received and the wake-on-frame enable bit is set,
         (i) set an interrupt bit in the egress port register to cause an interrupt signal to be sent to the CPU, such that receiving the interrupt signal will cause the CPU to wake up; and
         (ii) hold the packet in a queue;
      when the wake-on-frame enable bit is clear, send the packet to the CPU.

2. The apparatus of claim 1, wherein:
   the switch comprises an Ethernet switch; and
   the CPU and Ethernet switch are component parts of a same Ethernet routing device.

3. The apparatus of claim 1, wherein the switch comprises a queue controller configured to accumulate packets after the interrupt bit is set until the wake-on-frame enable bit is cleared.

4. The apparatus of claim 3, wherein the queue controller is configured to order the accumulated packets in the queue according to prioritization rules and identify a highest priority packet for sending first to the CPU.

5. A method, comprising:
   operating in a first state in which a switch that is part of a physical (PHY) layer of a device waits for a new packet from an originating device that is
   sent to a CPU that is part of a media access (MAC) layer of the device, where the CPU performs routing related processing on packets prior to sending the packets to destination devices, and further where the switch comprises an egress port register that includes a wake-on-frame enable bit that indicates whether the CPU is in an active state or an inactive state;
   when a packet is received and the wake-on-frame enable bit indicates that the CPU is in the inactive state, transitioning to a second state in which the switch:
   sets an interrupt bit in the egress port register to cause an interrupt signal to be sent to the CPU, such that receiving the interrupt signal will cause the CPU to wake up; and
   holds the packet in a queue;
   when the wake-on-frame enable bit indicates that the CPU is in the active state, transition ing to a third state in which the switch sends the packet to the CPU.

6. The method of claim 5, further comprising:
   while in the second state, accumulating packets in the queue after sending the interrupt signal to the CPU;
   while in the third state selecting a highest priority packet from accumulated packets and sending the highest priority packet to the CPU.

7. The method of claim 5, comprising while in the second state detecting a status change of the wake-on-frame enable bit.

8. The method of claim 5, wherein when the wake-on-frame enable bit is set, the CPU is powered off.

9. A router device comprising:
   a media access control (MAC) layer comprising a CPU configured to perform routing related processing on packets intended for respective network devices in an Ethernet network; and
   a physical (PHY) layer comprising:
      an Ethernet switch configured to receive a packet for processing by the CPU, wherein the Ethernet switch includes a plurality of egress ports configured to send packets to the CPU;
      wherein the egress ports comprise associated registers that include i) a wake-on-frame enable bit that is capable of being set and cleared by the CPU and ii) a wake-on-frame interrupt bit that, when set by the Ethernet switch, causes an interrupt signal to be sent to the CPU, such that receiving the interrupt signal will cause the CPU to wake up,
      wherein the CPU is configured to (i) set the wake-on-frame enable bit prior to entering a low power consumption state, and (ii) clear the wake-on-frame enable bit in response to receiving a wake-on-frame interrupt signal and entering a normal operating state; and
      wherein the Ethernet switch is configured to:
         wait for a new packet;
         when a packet is received and the wake-on-frame enable bit is set, (i) set the wake-on-frame interrupt bit and (ii) hold the packet in a queue;
         when the wake-on-frame enable bit is cleared by the CPU, send the packet to the CPU.

10. The device of claim 9, wherein the Ethernet switch includes a queue controller configured to (i) order packets according to prioritization rules and (ii) identify a highest priority packet based on the ordered packets, and, send the highest priority packet to the CPU.

* * * * *